(12) United States Patent
Miller (10) Patent No.: US 9,844,293 B2
(45) Date of Patent: Dec. 19, 2017

(54) APPARATUS FOR DISPENSING BEVERAGES

(71) Applicant: Spectrum Brands, Inc., Middleton, WI (US)

(72) Inventor: Randy Scott Miller, DeForest, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 15/054,303

(22) Filed: Feb. 26, 2016

(65) Prior Publication Data

US 2016/0255992 A1 Sep. 8, 2016

Related U.S. Application Data

(60) Provisional application No. 62/129,233, filed on Mar. 6, 2015.

(51) Int. Cl.
*A47J 31/44* (2006.01)
*F16M 11/04* (2006.01)

(52) U.S. Cl.
CPC ....... *A47J 31/4482* (2013.01); *A47J 31/4428* (2013.01); *F16M 11/046* (2013.01)

(58) Field of Classification Search
CPC .. A47J 31/4482; A47J 31/4428; F16M 11/046
USPC .................................................. 222/173, 108
See application file for complete search history.

(56) References Cited

U.S. PATENT DOCUMENTS

| 4,869,158 A | 9/1989 | Brewer |
| 5,865,094 A | 2/1999 | Kealy |
| 6,766,729 B2 | 7/2004 | Rolland |
| 7,478,584 B2 | 1/2009 | Turi |
| 7,543,526 B1 | 6/2009 | Tai |
| 7,592,027 B2 | 9/2009 | Halliday et al. |
| 7,673,558 B2 | 3/2010 | Panesar et al. |

(Continued)

FOREIGN PATENT DOCUMENTS

| CN | 101623172 A | 1/2010 |
| CN | 201505002 U | 6/2010 |

(Continued)

OTHER PUBLICATIONS

PCT/US16/20328 International Search Report dated May 20, 2016.

*Primary Examiner* — Donnell Long
(74) *Attorney, Agent, or Firm* — Kagan Binder, PLLC (57) ABSTRACT

A beverage dispensing apparatus for dispensing a beverage into a beverage container includes a base, a dispenser, and a platform for supporting the beverage container. The platform is positionable relative to the base between a first position and a second position, in the second position the platform is nearer to the dispenser than in the first position. The platform has a first orientation in the first position and a second orientation in the second position. The second orientation is inverted relative to the first orientation. The platform includes a peripheral sidewall and a central panel defining a first drip tray facing the dispenser in the first orientation of the platform and a second drip tray opposite the first drip tray and facing the dispenser in the second orientation of the platform. A support plate having a support surface is removably positionable on the first peripheral rim and second peripheral rim.

18 Claims, 12 Drawing Sheets

(56) References Cited

U.S. PATENT DOCUMENTS

| | | |
|---|---|---|
| 7,707,927 B2 | 5/2010 | Boussemart et al. |
| 7,997,187 B2 | 8/2011 | Garman et al. |
| 8,002,146 B2 | 8/2011 | Cahen et al. |
| 8,033,211 B2 | 10/2011 | Halliday et al. |
| 8,087,347 B2 | 1/2012 | Halliday et al. |
| 8,091,469 B2 | 1/2012 | Cahen et al. |
| 8,109,200 B2 | 2/2012 | Hansen |
| 8,205,647 B2 | 6/2012 | Carbonini |
| 8,333,144 B2 | 12/2012 | Boussemart et al. |
| 8,453,561 B2 | 6/2013 | Ferraris |
| 8,770,093 B2 | 7/2014 | Cahen et al. |
| 8,839,832 B2 | 9/2014 | Cahen et al. |
| 2003/0029322 A1 | 2/2003 | Rolland |
| 2006/0065126 A1 | 3/2006 | Turi |
| 2007/0157821 A1 | 7/2007 | Panesar et al. |
| 2007/0163446 A1 | 7/2007 | Halliday et al. |
| 2007/0175334 A1 | 8/2007 | Halliday et al. |
| 2008/0148950 A1 | 6/2008 | Cahen et al. |
| 2008/0187638 A1 | 8/2008 | Hansen |
| 2008/0216667 A1 | 9/2008 | Garman et al. |
| 2009/0126828 A1 | 5/2009 | Carbonini |
| 2010/0162900 A1 | 7/2010 | Westra |
| 2010/0199845 A1 | 8/2010 | aus Der Fuenten et al. |
| 2010/0236414 A1 | 9/2010 | Frigeri et al. |
| 2011/0097466 A1 | 4/2011 | Vastardis |
| 2011/0259200 A1 | 10/2011 | Luippold |
| 2011/0259202 A1 | 10/2011 | Cahen et al. |
| 2012/0052171 A1 | 3/2012 | Starr et al. |
| 2012/0121764 A1 | 5/2012 | Lai et al. |
| 2012/0121779 A1 | 5/2012 | Lai et al. |
| 2012/0121780 A1 | 5/2012 | Lai et al. |
| 2012/0177794 A1 | 7/2012 | Hansen |
| 2012/0187269 A1 | 7/2012 | Startz et al. |
| 2013/0061760 A1 | 3/2013 | Cahen et al. |
| 2013/0081739 A1 | 4/2013 | Cahen et al. |
| 2013/0112318 A1 | 5/2013 | Rithener et al. |
| 2013/0276636 A1 | 10/2013 | Rithener et al. |
| 2014/0013958 A1 | 1/2014 | Krasne et al. |
| 2014/0251494 A1 | 9/2014 | Stieger et al. |
| 2014/0299000 A1 | 10/2014 | Hanneson et al. |
| 2014/0345468 A1 | 11/2014 | Talon et al. |
| 2015/0223635 A1* | 8/2015 | Mulvaney ............... A47J 31/56 99/281 |

FOREIGN PATENT DOCUMENTS

| | | |
|---|---|---|
| CN | 201683735 U | 12/2010 |
| CN | 201691694 U | 1/2011 |
| CN | 202136179 U | 2/2012 |
| DE | 7915161 U1 | 3/1979 |
| DE | 2922922 A1 | 12/1979 |
| DE | 3903003 A1 | 8/1990 |
| DE | 19756479 A1 | 7/1999 |
| DE | 102006049893 B3 | 3/2008 |
| EP | 3549887 A2 | 7/1993 |
| EP | 3585607 A1 | 3/1994 |
| EP | 2050370 A1 | 4/2009 |
| EP | 2131705 B1 | 12/2010 |
| EP | 2323523 B1 | 10/2012 |
| EP | 2594173 A1 | 5/2013 |
| GB | 2449307 A | 11/2008 |
| JP | 2102614 | 4/1990 |
| JP | 9075224 A | 3/1997 |
| WO | 2010031665 A2 | 3/2010 |
| WO | 2012110287 A1 | 8/2012 |
| WO | 2013064709 A1 | 5/2013 |
| WO | 2013104636 A1 | 7/2013 |
| WO | 2013149937 A1 | 10/2013 |
| WO | 2013186339 A1 | 12/2013 |

* cited by examiner

APPARATUS FOR DISPENSING BEVERAGES

CROSS-REFERENCE TO RELATED APPLICATIONS

This application claims priority to U.S. Provisional Patent Application Ser. No. 62/129,233 filed on Mar. 6, 2015, which is incorporated herein by reference in its entirety.

BACKGROUND

The field of the disclosure relates generally to apparatus and methods for dispensing beverages, and more particularly to apparatus and methods for dispensing beverages into different sized containers.

Conventional beverage dispensers have a nozzle for dispensing beverages into beverage containers positioned on a surface below the nozzle. However, the distance between the surface and the nozzle limits the size of beverage containers that can be filled by the beverage dispenser. Specifically, tall beverage containers may not fit in the space between the nozzle and the surface. Conversely, if the space between the nozzle and the surface is greater than the height of the beverage container, an unacceptable amount of the beverage may splash and/or spill when the apparatus dispenses beverage towards the beverage container. Accordingly, some beverage dispensers are adjustable to allow users to dispense beverages into different sized containers. However, known beverage dispensers can be difficult to adjust and may include bulky components for supporting the different sized containers.

There is a need, therefore, for an improved beverage dispenser that a user can readily adjust to accommodate different sized beverage containers.

BRIEF DESCRIPTION

In one aspect, a beverage dispensing apparatus for dispensing a beverage into a beverage container is provided. The apparatus includes a base, a dispenser disposed above the base and operable to dispense beverage from the apparatus toward the base, and a platform for supporting the beverage container intermediate the base and the dispenser. The platform is positionable relative to the base between a first position and a second position, in the second position the platform is nearer to the dispenser than in the first position. The platform has a first orientation in the first position and a second orientation in the second position. The second orientation is inverted relative to the first orientation. The platform includes a peripheral sidewall having a first peripheral rim and a second peripheral rim. A central panel extends transversely within the sidewall intermediate the first and second rims to define a first drip tray facing the dispenser in the first orientation of the platform and a second drip tray opposite the first drip tray and facing the dispenser in the second orientation of the platform. A support plate has a support surface for seating the beverage container on the support plate in both the first and second orientations of the platform. The support plate is removably positionable relative to the peripheral sidewall such that in the first orientation of the platform the support plate is positioned on the first peripheral rim with the support surface facing the dispenser and in the second orientation of the platform the support plate is positioned on the second peripheral rim with the support surface facing the dispenser. The support surface has at least one opening therein through which beverage that drips onto the support surface can flow into the respective one of the first drip tray and the second drip tray.

In another aspect, a platform for supporting a beverage container such that a beverage dispensing apparatus can dispense beverages into the beverage container is provided. The platform supports the beverage container intermediate a base and dispenser of the beverage dispenser. The platform is positionable relative to the base between a first position and a second position. In the second position, the platform is nearer to the dispenser than in the first position. The platform has a first orientation in the first position and a second orientation in the second position. The second orientation is inverted relative to the first orientation. The platform includes a peripheral sidewall having a first peripheral rim and a second peripheral rim. A central panel extends transversely within the peripheral sidewall intermediate the first and second rims to define a first drip tray facing the dispenser in the first orientation of the platform and a second drip tray opposite the first drip tray and facing the dispenser in the second orientation of the platform. A support plate has a support surface for seating the beverage container on the support plate in both the first and second orientations of the platform. The support plate is removably positionable relative to the peripheral sidewall such that in the first orientation of the platform the support plate is positioned on the first peripheral rim with the support surface facing the dispenser and in the second orientation of the platform the support plate is positioned on the second peripheral rim with the support surface facing the dispenser. The support surface has at least one opening therein through which beverage that drips onto the support surface can flow into the respective one of the first drip tray and the second drip tray. A support extends away from the second drip tray to support the second drip tray when the platform is in the second position.

DRAWINGS

Corresponding reference characters indicate corresponding parts throughout the several views of the drawings.

DETAILED DESCRIPTION

Figure 1:
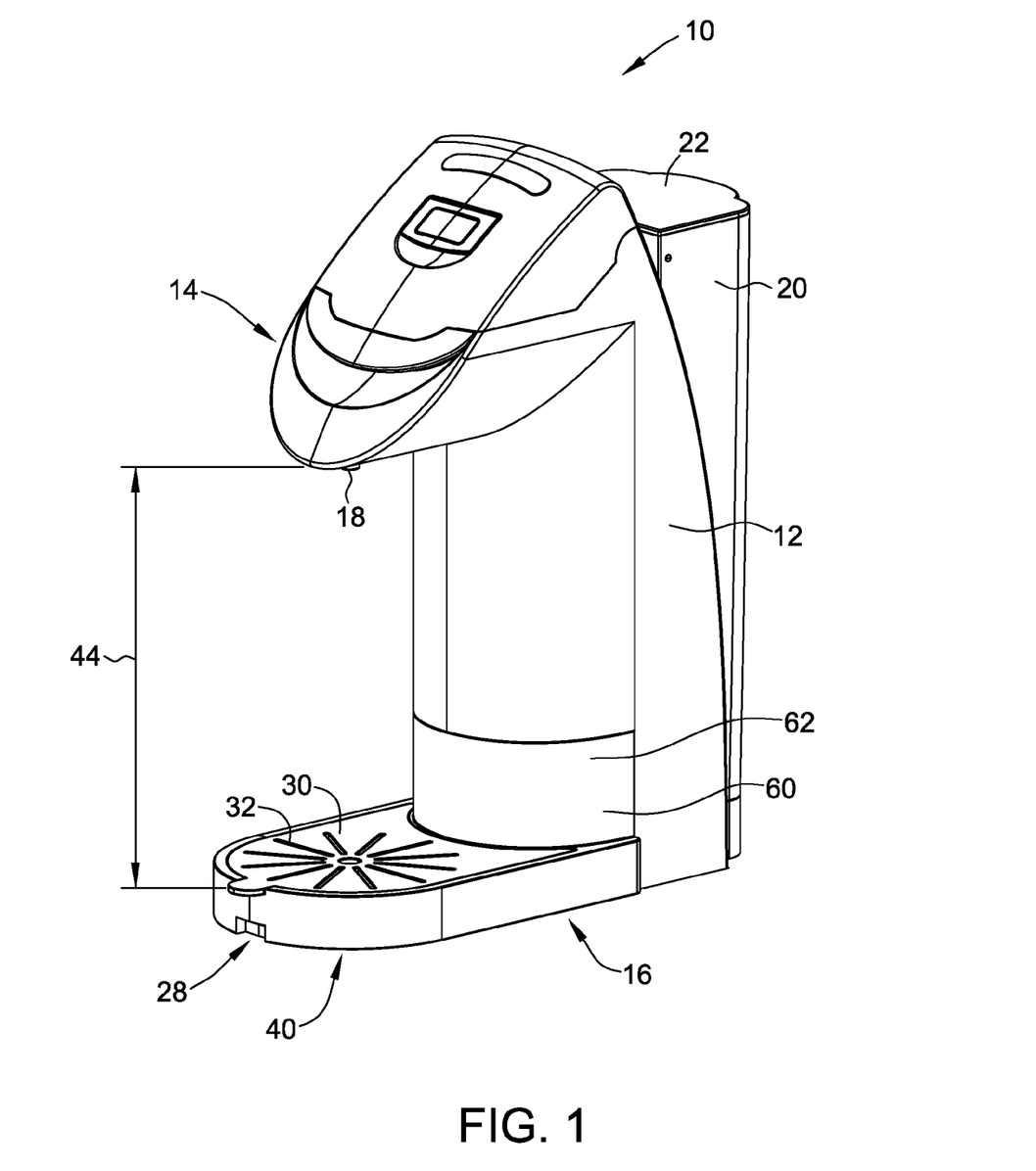
FIG. 1 is a perspective view of one embodiment of an apparatus for dispensing beverages, the apparatus including a platform for supporting a beverage container in a first position.
Figure 2:
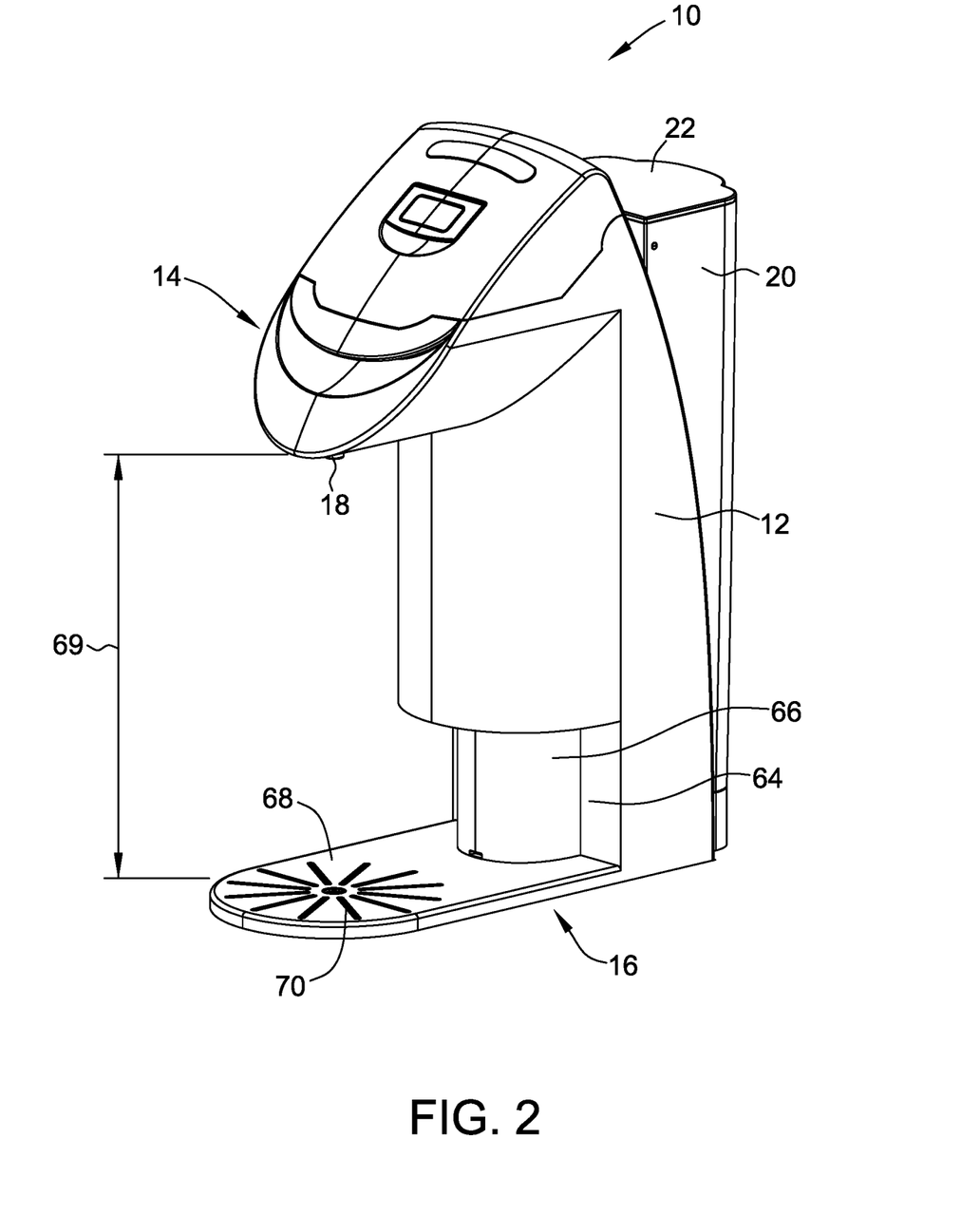
FIG. 2 is a perspective view of the apparatus of FIG. 1 with the platform removed.
Figure 3:
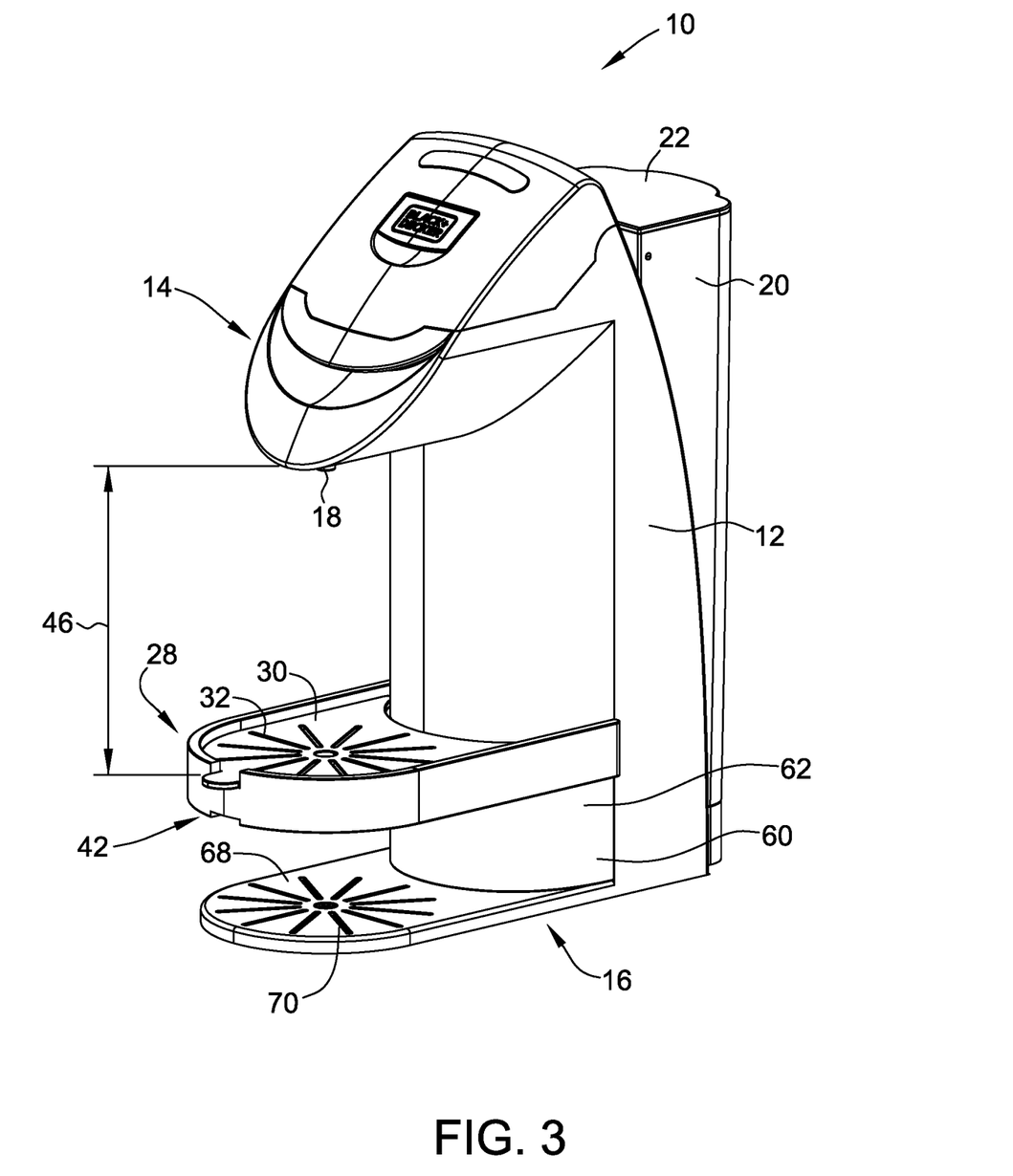
FIG. 3 is a perspective view of the apparatus of FIG. 1 with the platform in a second position.
Figure 4:
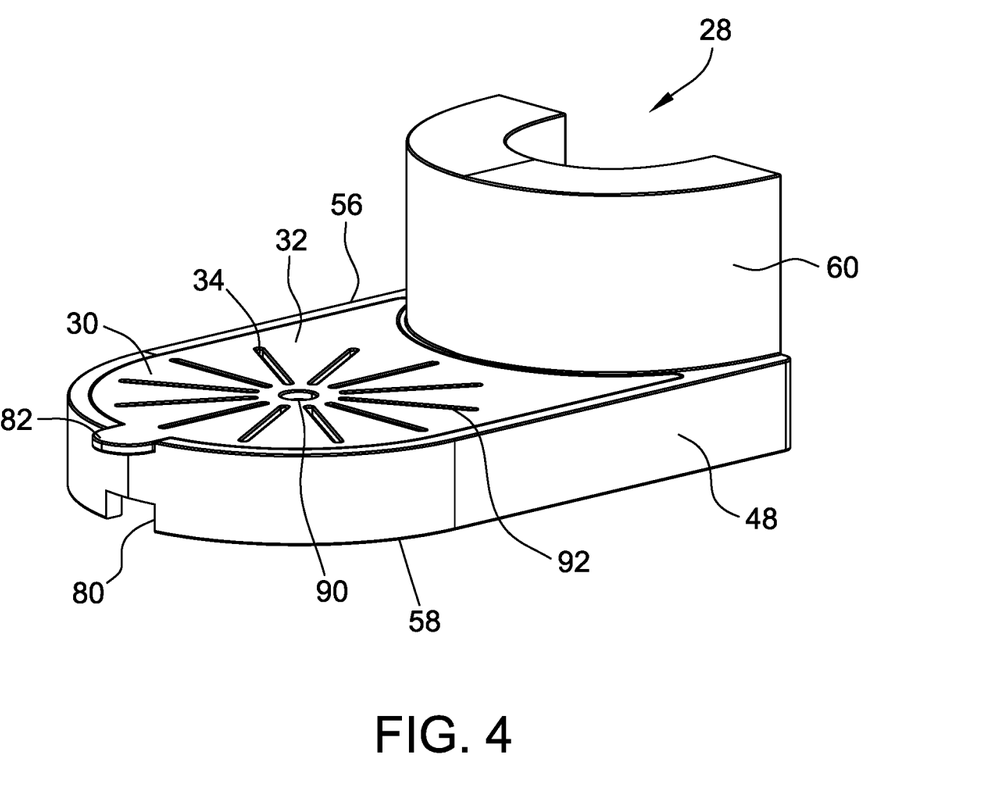
FIG. 4 is a perspective view of one embodiment of the platform with a drip tray in a first position.
Figure 5:
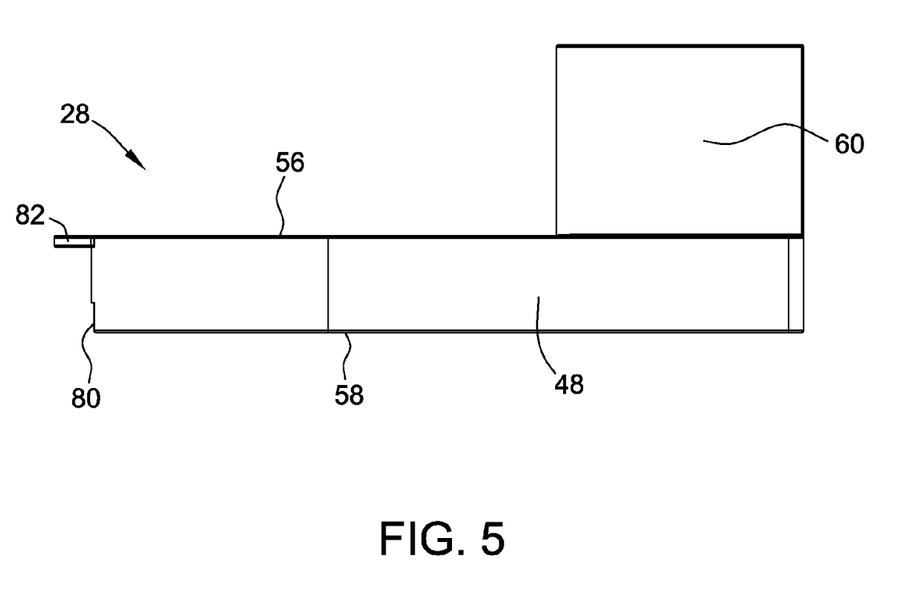
FIG. 5 is a side view of the platform of FIG. 4.
Figure 6:
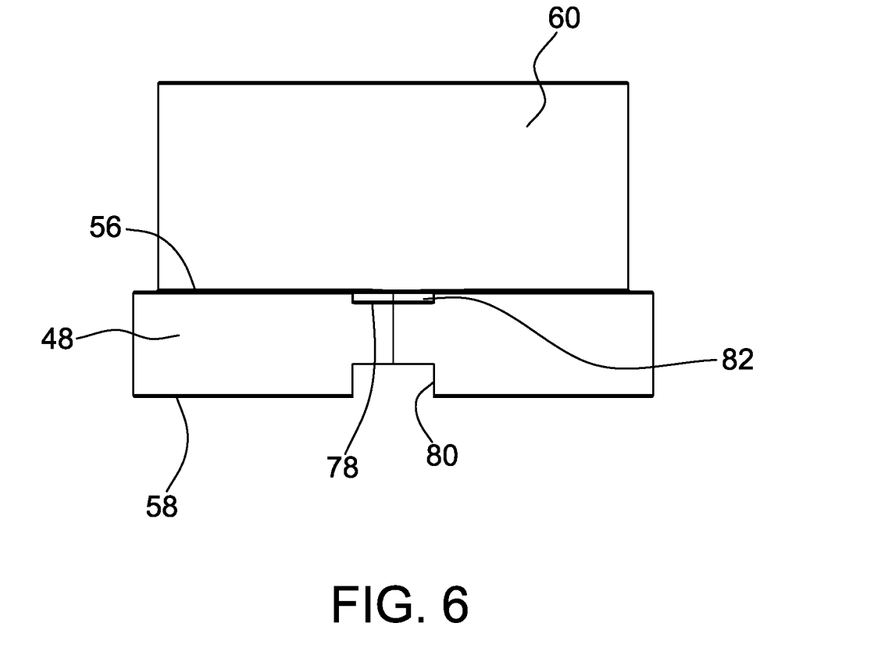
FIG. 6 is a front view of the platform of FIG. 4.
Figure 7:
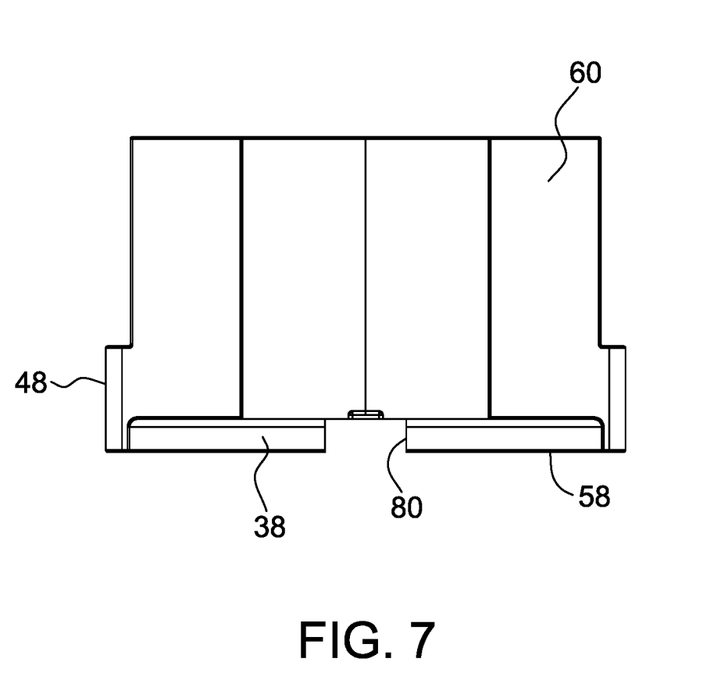
FIG. 7 is a back view of the platform of FIG. 4.
Figure 8:
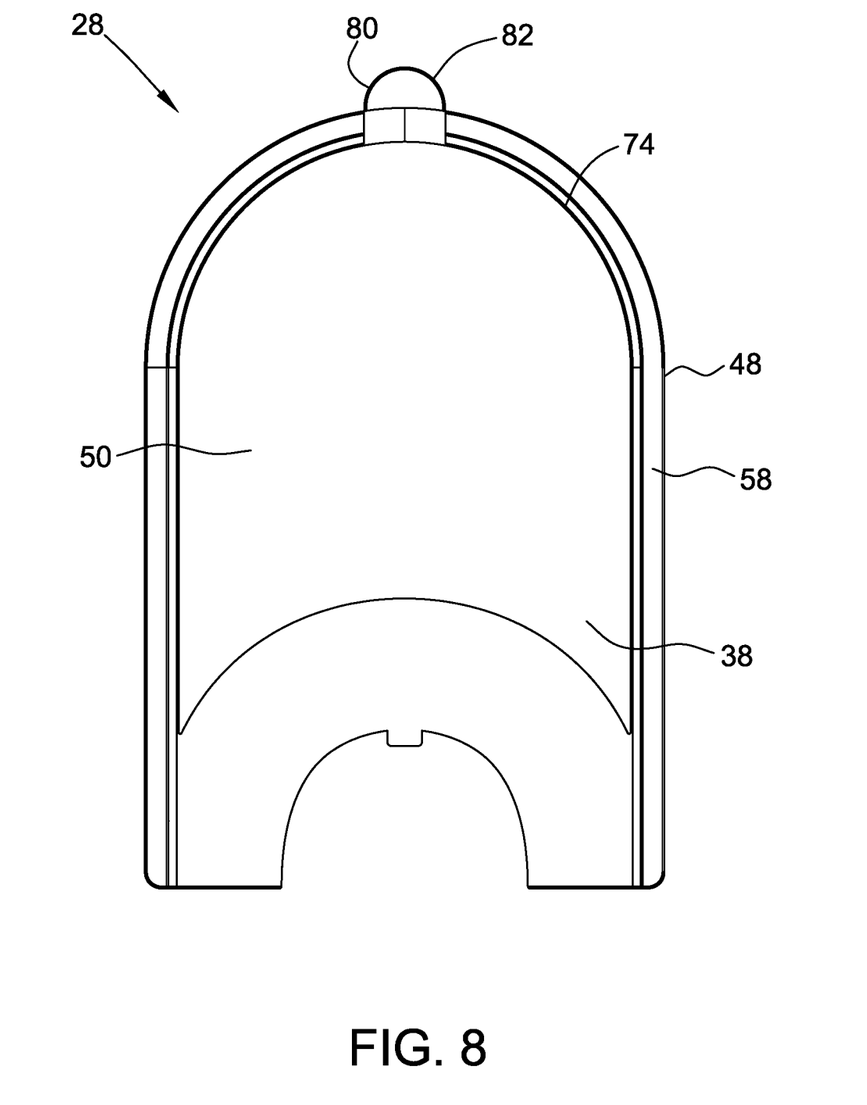
FIG. 8 is a bottom view of the platform of FIG. 4.
Figure 9:
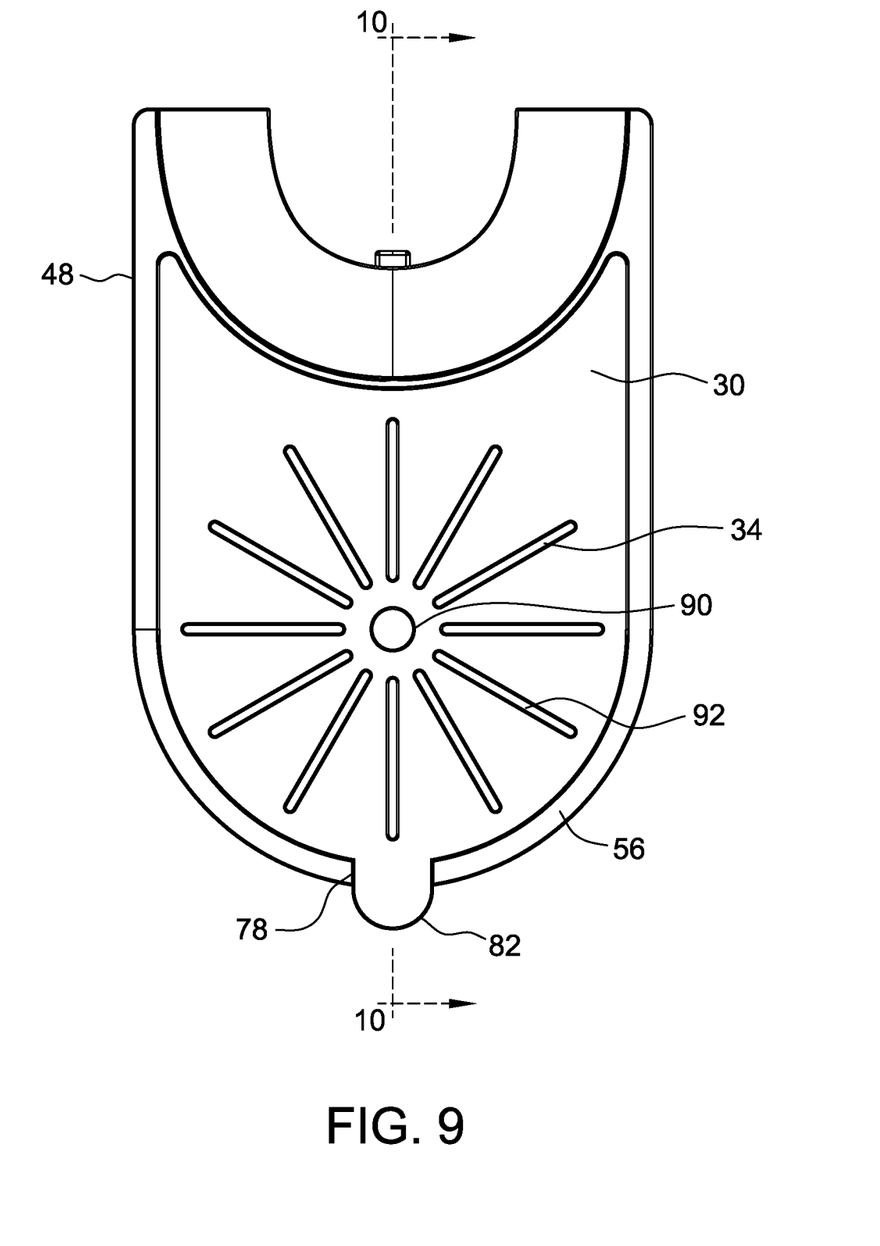
FIG. 9 is a top view of the platform of FIG. 4.

The apparatus and methods described herein relate to the dispensing of beverages into a beverage container, such as a cup, tumbler, travel container, or the like. With reference to the drawings, and in particular to FIGS. 1-3, one embodiment of an apparatus for dispensing beverages is indicated generally at 10. The illustrated dispensing apparatus 10 is a brewer for the hot brewing of beverages from precursor particulates or liquid concentrates such as, without limitation, coffee and tea. It is understood, however, that in other embodiments the apparatus 10 and the various components thereof may be configured and/or used for making other beverages. In further embodiments, the dispensing apparatus 10 may be any type of apparatus that dispenses beverages into a beverage container and may not necessarily make the beverages.

With particular reference to FIG. 1, the appliance generally comprises a housing 12, a dispensing portion 14, and a base 16. The dispensing portion 14 includes a heating system (not shown), a brew basket (not shown), and a nozzle 18. The brew basket may be any conventional brew basket such as, without limitation, a basket that holds a separate paper or other filter into which the precursor particles are loaded, a basket that is made in part of a filter material so that precursor particles are loaded directly into the basket, or a basket that is itself a replaceable cartridge that holds a beverage precursor. In the exemplary embodiment, the brew basket is generally cup-shaped or frusto-conical and has an open upper end through which precursor particulates are loaded into the brew basket. The brew basket may be constructed from any suitable material, such as, without limitation, metal, glass, ceramic, and/or plastic, that enables the apparatus 10 to function as described herein. The brew basket may be removable from the apparatus 10 and/or may be moveable relative to the housing for loading precursor particulates therein, for emptying used particulates, and for cleaning the basket.

The apparatus 10 further includes a reservoir 20 for holding liquid, e.g., without limitation, water or other suitable liquid for brewing beverages. The reservoir has a lid 22 that can be positioned between a closed position for closing the interior of the reservoir and an opened position that allows access to the interior of the reservoir 20. Accordingly, a user can open the lid 22 and fill the reservoir 20 with a liquid prior to brewing a beverage. Alternatively, the reservoir 20 may be connected to a liquid (e.g., water) source whereby liquid is introduced by action of the user, or introduced automatically into the reservoir 20 whenever the watermark therein falls below a predetermined threshold. The reservoir 20, in one example, has a liquid volume capacity in the range of about 180 cubic centimeters (cc) (6 fluid ounces (fl. oz.)) to about 475 cc (16 fl. oz.). Alternatively, the reservoir 20 may have any suitable liquid volume capacity that permits the apparatus 10 to operate as described herein. The reservoir 20 is flowingly connected to the brew basket such that liquid in the reservoir can be delivered to the brew basket to brew beverages.

In one suitable embodiment, the reservoir 20 is in communication with the heating system (not shown) located inside the housing. Alternatively, the heating unit may be located within the reservoir 20, remote from the reservoir, or be omitted. It is also contemplated that the reservoir 20 or other suitable source of liquid may be located remotely from the apparatus 10, by itself or with the heating unit. The heating unit may be an electric heating unit such as a CALROD heating unit, or any other suitable heating system that enables the apparatus 10 to function as described herein. In some embodiments, the apparatus 10 may be connected to a power outlet (not shown) via a power cord (not shown) to power the heating system or other electrical components. Alternatively, or additionally, the apparatus 10 may be powered by a battery (not shown) or by any other power source that enables the apparatus 10 to function as described herein.

In the illustrated embodiment, a controller controls the automated brewing and dispensing processes. The controller may be disposed on the housing or may be separate from the housing 12. The controller may comprise any of various controller systems, user interfaces, switches (such as, e.g., power switch), circuits, and the like. In the example embodiment, the controller allows the user to select the amount of beverage to be dispensed by the beverage dispenser from preset amounts, e.g., a first amount that is sufficient to fill a relatively tall beverage container and a second amount that is sufficient to fill a relatively short beverage container. The controller 24 according to one embodiment suitably includes one or more voltage regulators and/or transformers (not shown) as needed to supply appropriate power to the various electrical components of the apparatus 10. The power switch may be implemented as a momentary contact switch to facilitate "auto shut-off" functionality in association with the controller, as is common in many household appliances As shown in FIGS. 1 and 3, a platform 28 is releasably attached to the housing 12 at the base 16 of the apparatus 10 for supporting a beverage container (not shown). The beverage container can be any suitable beverage container, e.g., without limitation, a cup, coffee mug, thermos, carafe, pitcher, bottle, or any other suitable receptacle for holding liquids. The platform 28 is configured to support the beverage container such that the container is positioned underneath the dispensing portion 14 of the apparatus 10 and is aligned with the nozzle 18 to receive liquid dispensed through the nozzle.

Figure 10:
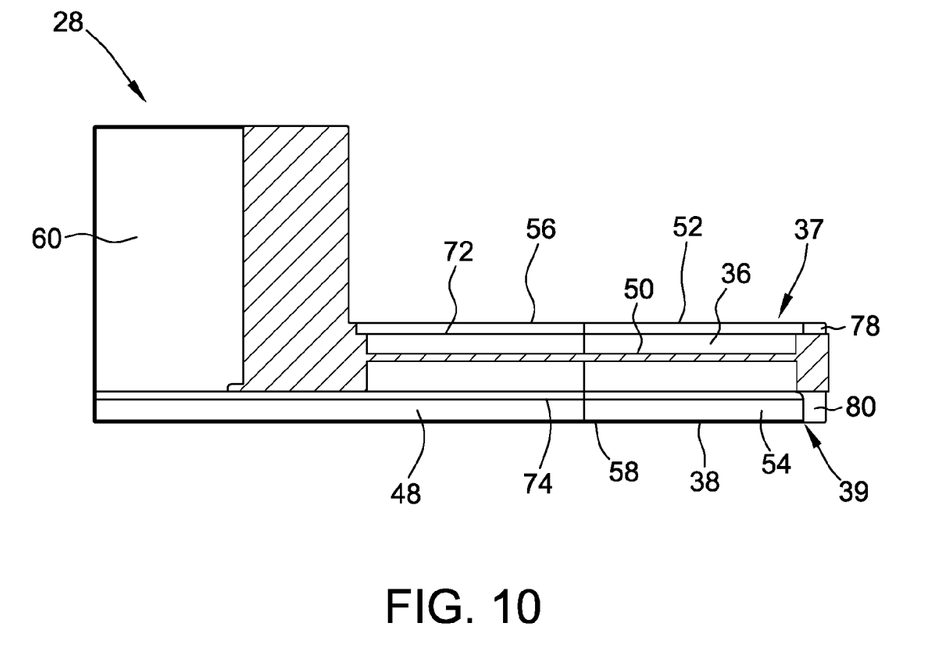
FIG. 10 is a cross section view of the platform with the drip tray removed taken along section line A-A.
Figure 11:
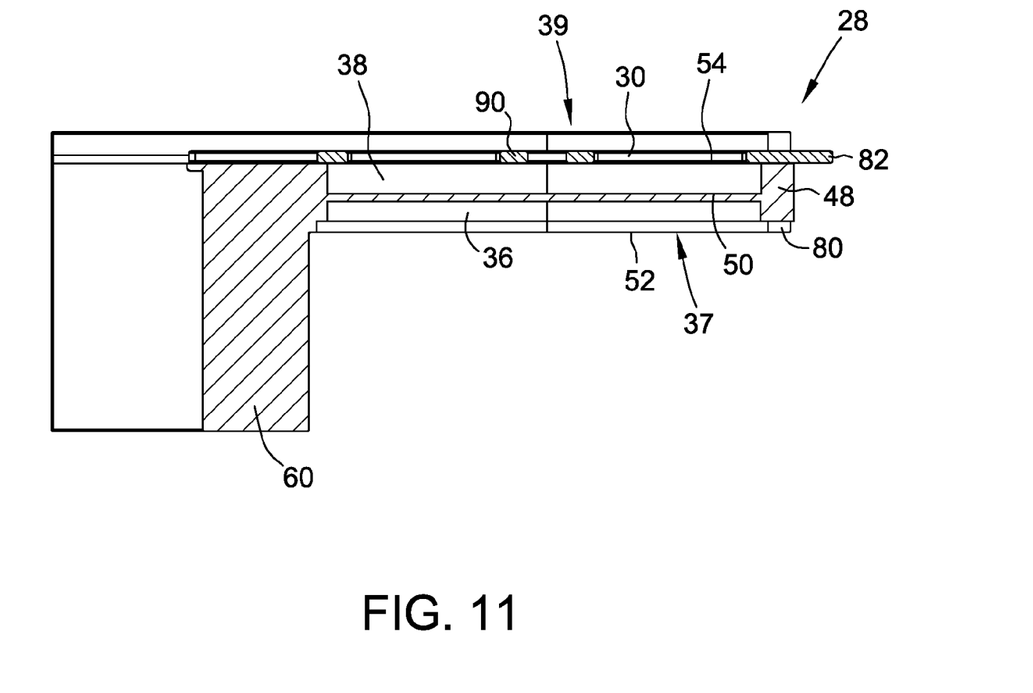
FIG. 11 is a cross section view of the platform in a second position taken along section line A-A.
Figure 12:
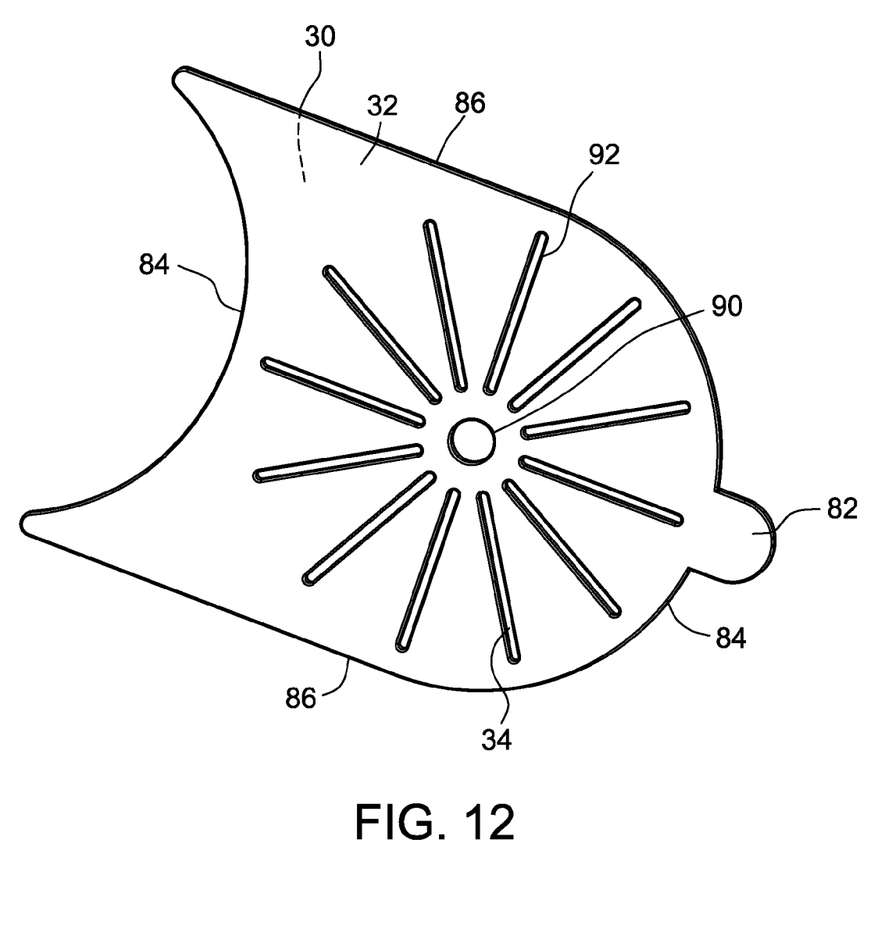
FIG. 12 is a perspective view of an embodiment of a drip tray suitable for use with the apparatus of FIG. 1.

With reference now to FIGS. 4-12, the platform 28 includes a support plate 30 having a support surface 32 to receive the beverage container. The surface 32 has a plurality of openings 34 to allow liquid on the support plate 30 to flow therethrough. As best seen in FIGS. 10 and 11, the platform 28 further includes a first compartment 36, i.e., a first well, and a second compartment 38, i.e., a second well, disposed opposite the first compartment 36. The support plate 30 can be selectively disposed on each of the first compartment 36 and the second compartment 38 such that the respective compartment collects liquid that flows through the openings 34 in the support plate 30. As a result, dispensed beverage that splashes or overflows from the beverage container may strike the surface 32, flow through the openings 34, and collect in the respective first or second compartment 36, 38.

The platform 28 can be selectively positioned between a first position 40 (shown in FIG. 1) and a second position 42 (shown in FIG. 3) to accommodate beverage containers of different sizes. In the first position 40, the support plate 30 is disposed on the first compartment 36 such that the surface 32 of the support plate 30 is a first distance 44 from the dispensing portion 14. In the second position 42, the support plate 30 is disposed on the second compartment 38 such that the surface 32 of the support plate 30 is a second distance 46 from the dispensing portion 14. In the illustrated embodiment, the first distance 44 is greater than the second distance 46 such that the apparatus 10 accommodates relatively tall beverage containers supported by the platform 28 in the first position 40. In contrast, when in the second position, the platform 28 supports relatively short beverage containers closer to the dispensing portion to minimize splashing while liquid is dispensed through the nozzle 18 into the beverage container. In suitable embodiments, the platform 28 may be selectively positionable between any number of positions, for example the platform 28 may include a third intermediate position (not shown) where the surface 32 is located a third distance from the dispensing portion 14.

In one example, the first distance 44 is between about 150 mm (5.9 in.) and about 250 mm (9.8 in.). In the illustrated embodiment, the first distance 44 is approximately 191 mm (7.5 in.). Suitably, the second distance 46 is between about 100 mm (3.9 in.) and about 175 mm (6.9 in.). In the illustrated embodiment, the second distance 46 is approximately 137 mm (5.4 in.). The first distance and the second distance facilitate the apparatus 10 accommodating standard-sized beverage containers while having sufficient clearance for a range of nonstandard-sized beverage containers. In alternate embodiments, the first distance 44 and the second distance 46 may be any suitable distances that enable the apparatus 10 to function as described herein.

The platform 28 further includes a continuous sidewall 48 defining the first compartment 36 and the second compartment 38. In the illustrated embodiment, the sidewall 48 has rounded and linear portions. In alternate embodiments, the platform 28 may have any number of sidewalls having any shape. The second compartment 38 is separated from the first compartment 36 by a central panel 50 extending transversely within the sidewall 48 at approximately the midpoint of the sidewall. The central panel 50 separates the second compartment 38 from the first compartment 36 such that liquid collected in one of the compartments will not flow to the other compartment. The central panel 50 is substantially parallel to the surface 32 when the support plate 30 is disposed on the first compartment 36 and is also substantially parallel to the surface when the drip tray is disposed on the second compartment 38.

With particular reference to FIGS. 10 and 11, each of the first compartment 36 and the second compartment 38 includes an open end 52, 54. The open end 52 of the first compartment 36 is defined along a first peripheral rim 56 of the sidewall spaced from the central panel 50. The open end 54 of the second compartment 38 is defined along an opposite second peripheral rim 58 of the sidewall spaced from the central panel 50. Accordingly, the first compartment 36 and the second compartment 38 form first and second drip trays 37, 39, respectively, for holding liquid defined by the sidewall 48 and the central panel 50. The central panel 50 is disposed between the open ends 52, 54 such that the first compartment 36 and the second compartment 38 form drip trays 37, 39 that face away from each other. Accordingly, only one of the first compartment 36 and the second compartment 38 may be positioned to collect liquid at a time. For example, when the platform 28 is positioned in the first position 40, the sidewall 48 and the central panel 50 will retain liquid entering the first compartment 36 through the open end 52. Conversely, when the platform 28 is positioned in the first position 40, liquid in the second compartment 38 will flow out the open end 54, which is positioned below the sidewall 48 and the central panel 50. As a result, when the platform 28 is in the first position 40, the first compartment 36 will collect liquid and the second compartment 38 will not collect liquid. Oppositely, when the platform 28 is in the second position 42, the second compartment 38 will collect liquid and the first compartment 36 will not collect liquid.

In the illustrated embodiment, the platform 28 further includes a support 60 extending away from both the first compartment 36 and the second compartment 38 in a direction generally perpendicular to the central panel 50. The support 60 can be inserted at least partially into the housing 12 to releasably attach the platform 28 to the housing. To facilitate removal and repositioning of the platform 28, the support 60 and the housing 12 are free of any securement mechanism to secure the platform 28 in either the first position 40 or the second position 42. In alternate embodiments, the platform 28 and/or the housing 12 may include any conventional securement mechanism to secure the platform 28 in the first position 40 and/or the second position 42. In the illustrated embodiment, a surface 62 of the support 60 aligns flush with the housing 12 when the platform 28 is releasably attached to the housing in either the first position 40 or the second position 42. When the platform 28 is attached to the housing 12 in the second position 42, the support 60 extends between the second compartment 38 and the base 16 to support the second compartment 38 and the support plate 30 at the second distance 46 from the dispensing portion 14. It is also understood that in other embodiments the platform 28 may be supported by and/or rest on any portions of the apparatus 10 and/or surfaces adjacent the apparatus.

As best seen in FIG. 2, the housing 12 includes a cavity 64 disposed adjacent the base 16 for receiving a portion of the support 60. The cavity 64 facilitates the platform 28 being releasably attached to the housing 12. The cavity 64 includes an alignment member 66 to facilitate aligning the platform 28 under the dispensing portion 14 when the platform 28 is attached to the housing in either the first position 40 or the second position 42. In alternate embodiments, the alignment member 66 and support 60 may be any suitable shapes and configurations that facilitate aligning the platform 28. In the illustrated embodiment, the alignment member 66 is a cylindrical protrusion extending along the center of the cavity 64 and the support 60 has a partially cylindrical shape that fits around the alignment member. In alternate embodiments, the alignment member 66 may be omitted.

In the illustrated embodiment, the base 16 includes a base surface 68 that can support the beverage container if the platform 28 is removed. The base surface 68 includes a plurality of divots 70 to collect liquid that spills onto the base surface. The base surface 68 is disposed a fourth distance 69 from the dispensing portion 14 that is greater than each of the first distance 44 and the second distance 46. Suitably, the fourth distance 69 is between about 175 mm (6.9 in.) and about 250 mm (9.8 in.). In the illustrated embodiment, the fourth distance 69 is approximately 210 mm (8.3 in.). The base 16 and base surface 68 facilitate positioning the platform 28 in the first position 40 and the second position 42. In the first position 40, the platform 28 is positioned directly over the base 16 such that the base surface 68 substantially covers the open end 54 of the second compartment 38. When the platform 28 is in the second position 42, the base 16 extends underneath the platform 28 and provides support for the apparatus 10.

As best seen in FIGS. 10 and 11, each of the first compartment 36 and the second compartment 38 include a shelf 72, 74 defined by the sidewall 48 along the respective first and second peripheral rims 56, 58 of the sidewall. The shelves 74, 76 support the support plate 30 and facilitate aligning the drip tray on the respective first and second compartments 36, 38. Additionally, each of the first and second peripheral rims 56, 58 has a notch 78, 80 to receive a tab 82 of the support plate 30. Accordingly, in the first position 40, the support plate 30 sits on the shelf 72 and the tab 82 extends through the notch 78 to facilitate a user removing the support plate 30 from the first compartment 36. In the second position 42, the support plate 30 sits on the shelf 74 and the tab 82 extends through the notch 80 to facilitate a user removing the support plate 30 from the second compartment 38. In suitable embodiments, the tab 82 may be any shape and be disposed on any portion of the support plate 30. In the illustrated embodiment, the tab 82 is a semicircle extending from one of the rounded edges 84 of the support plate 30. In alternate embodiments, the tab 82 may be omitted.

In suitable embodiments, the support plate 30 may have any suitable shape to facilitate the drip tray functioning as described herein. In the example embodiment, the support plate 30 has two rounded edges 84 and two lateral edges 86 that are partially straight defining a bullet-like shape with a rounded cutout. The shape of the support plate 30 facilitates the drip tray at least partially covering either the first compartment 36 or the second compartment 38 and being aligned on the platform 28. In some embodiments, the support plate 30 further comprises a ridge (not shown) extending away from the surface 62. The ridge abuts against the sidewall 48 to facilitate positioning the support plate 30 on the either the first compartment 36 or the second compartment 38. In suitable embodiments, the ridge may be disposed on any portion of the support plate 30 or may be omitted. In one embodiment, the ridge extends around the entirety of the support plate 30 adjacent the outer edges 84, 86.

In suitable embodiments, the support plate 30 may have any number of the openings 34 having any shape and size. For example, in an alternate embodiment the drip tray is a grid defining a plurality of openings. In the illustrated embodiment, the support plate 30 has a single central opening 90 and a plurality of outer openings 92. Specifically, the support plate 30 has 12 of the outer openings 92 in the example embodiment. In suitable embodiments, all the openings 34 may have different or similar shapes and may be disposed in any portions of the support plate 30. In the illustrated embodiment, the central opening 90 is a circular opening disposed approximately in the center of the support plate 30 relative to one of the rounded edges 84 and the outer openings 92 are substantially linear slots extending radially away from the central opening 90 towards the outer edges 84, 86 of the support plate 30. It is understood that in suitable embodiments, the support plate 30 may have only one opening 34.

In operation, a user positions the beverage container on the support plate 30 of the platform 28 and aligns the drink container under the dispensing portion 14 such that liquid can be directed through the nozzle 18 into the container. The user activates the apparatus 10 and selects an amount of beverage for the apparatus to dispense. Optionally, upon initiation of a brewing function, the heating system heats liquid held in the reservoir and the heated liquid is delivered to the brew basket to brew a beverage. The selected amount of beverage is dispensed from the nozzle 18 into the beverage container supported by the platform 28. The platform 28 may be positioned in either the first position 40 or the second position 42 to support the beverage container. Suitably, the platform 28 is positioned in the first position 40 if the user is dispensing beverage into a relatively tall beverage container. If the user is dispensing beverage into a relatively short beverage container, the platform 28 is positioned in the second position 42.

To switch the position of the platform 28 from the first position 40 to the second position 42, the user removes the platform from the housing 12 and removes the support plate 30 from the first compartment 36. The user then inverts the platform 28 such that the second compartment 38 is facing generally upward and the first compartment 36 is facing generally downward, in relation to the orientation of the apparatus 10 shown in FIGS. 1-3. The support plate 30 is positioned on the second compartment 38 and the platform 28 is inserted in the cavity 64. The platform 28 supports the beverage container in the second position 42 such that a relatively short container is positioned a distance from the dispensing portion sufficient to minimize splashing. To switch from the second position 42 to the first position 40, the user removes the platform 28 from the housing and removes the support plate 30 from the second compartment 38. Subsequently, the user inverts the platform 28 such that the first compartment 36 is facing generally upward and the second compartment 38 is facing generally downward. Finally, the support plate 30 is positioned on the first compartment 36 and the platform 28 is inserted in the housing 12.

Embodiments of the apparatus 10 disclosed herein facilitate a user dispensing beverages into beverage containers of desired sizes. The apparatus 10 is easily adjustable to accommodate relatively tall and relatively short beverage containers. The apparatus 10 utilizes a single support plate 30 in multiple positions to facilitate cleaning and to minimize the components of the apparatus that have to be manufactured and assembled. As a result, the apparatus 10 solves the problem of providing a beverage dispenser including simplified adjustable components for effectively accommodating a wide range of different sized beverage containers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A beverage dispensing apparatus for dispensing a beverage into a beverage container, the apparatus comprising:
 a base;
 a dispenser disposed above the base and operable to dispense beverage from the apparatus toward the base; and
 a platform for supporting the beverage container intermediate the base and the dispenser, the platform being positionable relative to the base between a first position and a second position, in the second position the platform being nearer to the dispenser than in the first position, said platform having a first orientation in the first position and a second orientation in the second position, said second orientation being inverted relative to the first orientation, the platform comprising:
  a peripheral sidewall having a first peripheral rim and a second peripheral rim;
  a central panel extending transversely within the peripheral sidewall intermediate the first and second rims to define a first drip tray facing the dispenser in the first orientation of the platform and a second drip tray opposite the first drip tray and facing the dispenser in the second orientation of the platform; and
  a support plate having a support surface for seating the beverage container on the support plate in both the first and second orientations of the platform, the support plate being removably positionable relative to the peripheral sidewall such that in the first orientation of the platform the support plate is positioned on the first peripheral rim with the support surface facing the dispenser and in the second orientation of the platform the support plate is positioned on the second peripheral rim with the support surface facing the dispenser, the support surface having at least one opening therein through which beverage that drips onto the support surface can flow into the respective one of the first drip tray and the second drip tray.

2. The apparatus of claim 1 wherein a surface of the first drip tray and the central panel are substantially parallel.

3. The apparatus of claim 2 wherein the peripheral sidewall is a single continuous sidewall.

4. The apparatus of claim 3 wherein each of the first and second peripheral rims define a shelf for supporting the support plate.

5. The apparatus of claim 1 wherein the platform further comprises a support extending away from the second drip tray for supporting the second drip tray when the platform is in the second position.

6. The apparatus of claim 5 further comprising a housing, wherein the housing defines a cavity for receiving at least a portion of the support to releasably attach the platform to the base.

7. The apparatus of claim 6 wherein the housing includes a partially cylindrical alignment member and the support has a partially cylindrical wall for fitting around the alignment member and aligning the platform underneath the dispenser when the platform is in the first and second positions.

8. The apparatus of claim 6 wherein the outer surface of the support is substantially flush with the housing when the platform is inserted in the cavity.

9. The apparatus of claim 1 wherein the support surface is disposed between about 150 mm and about 250 mm from the dispenser when the platform is in the first position.

10. The apparatus of claim 9 wherein the support surface is disposed between about 100 mm and about 175 mm from the dispenser when the platform is in the second position.

11. The apparatus of claim 1 further comprising an alignment member to align the platform in both the first and second positions.

12. The platform of claim 1 wherein the support plate further comprises a tab and the peripheral sidewall includes at least one notch, the tab extending through the at least one notch to facilitate removing the first drip tray.

13. A platform for supporting a beverage container such that a beverage dispensing apparatus can dispense beverages into the beverage container, the platform supporting the beverage container intermediate a base and dispenser of the beverage dispenser, the platform being positionable relative to the base between a first position and a second position, in the second position the platform being nearer to the dispenser than in the first position, said platform having a first orientation in the first position and a second orientation in the second position, said second orientation being inverted relative to the first orientation, the platform comprising:
    a peripheral sidewall having a first peripheral rim and a second peripheral rim;
    a central panel extending transversely within the peripheral sidewall intermediate the first and second rims to define a first drip tray facing the dispenser in the first orientation of the platform and a second drip tray opposite the first drip tray and facing the dispenser in the second orientation of the platform;
    a support plate having a support surface for seating the beverage container on the support plate in both the first and second orientations of the platform, the support plate being removably positionable relative to the peripheral sidewall such that in the first orientation of the platform the support plate is positioned on the first peripheral rim with the support surface facing the dispenser and in the second orientation of the platform the support plate is positioned on the second peripheral rim with the support surface facing the dispenser, the support surface having at least one opening therein through which beverage that drips onto the support surface can flow into the respective one of the first drip tray and the second drip tray; and
    a support extending away from the second drip tray to support the second drip tray when the platform is in the second position.

14. The platform of claim 13 wherein the support surface has a plurality of openings.

15. The platform of claim 13 wherein the support plate comprises a tab to facilitate removing the support plate from the first and second drip trays.

16. The platform of claim 13 wherein the support plate further comprises a ridge for aligning and retaining the support plate on the first and second drip trays.

17. The platform of claim 13 wherein the support surface and the central panel are substantially parallel.

18. The platform of claim 17 wherein the peripheral sidewall is a single continuous sidewall.

* * * * *

UNITED STATES PATENT AND TRADEMARK OFFICE
CERTIFICATE OF CORRECTION

PATENT NO. : 9,844,293 B2
APPLICATION NO. : 15/054303
DATED : December 19, 2017
INVENTOR(S) : Randy Scott Miller Page 1 of 1

It is certified that error appears in the above-identified patent and that said Letters Patent is hereby corrected as shown below:

FOREIGN PATENT DOCUMENTS
Line 9 "3549887 A2" should be – 0549887 –
Line 10 "3585607 A1" should be – 0585607 –

Signed and Sealed this
Twentieth Day of February, 2018

Andrei Iancu
*Director of the United States Patent and Trademark Office*